United States Patent [19]
Kowal

[11] Patent Number: 5,267,241
[45] Date of Patent: Nov. 30, 1993

[54] ERROR CORRECTION CODE DYNAMIC RANGE CONTROL SYSTEM

[75] Inventor: Stephen J. Kowal, Boulder, Colo.

[73] Assignee: Avasem Corporation, San Jose, Calif.

[21] Appl. No.: 26,264

[22] Filed: Mar. 4, 1993

Related U.S. Application Data

[63] Continuation of Ser. No. 504,620, Apr. 4, 1990, abandoned.

[51] Int. Cl.$^5$ ............................................. G11C 29/00
[52] U.S. Cl. ................................... 371/5.3; 371/40.1
[58] Field of Search ................. 371/5.3, 5.1, 37.1, 371/40.1, 13

[56] References Cited

U.S. PATENT DOCUMENTS

| | | | |
|---|---|---|---|
| 3,825,893 | 7/1974 | Bossen et al. | 371/37.6 |
| 4,157,454 | 6/1979 | Becker | 364/900 X |
| 4,359,772 | 11/1982 | Patel | 371/38.1 |
| 4,523,314 | 6/1985 | Burns et al. | 371/40.1 |
| 4,561,095 | 12/1985 | Khan | 371/40.1 |
| 4,637,023 | 1/1987 | Lounsburg | 371/13 |
| 4,649,540 | 3/1987 | Proebsting | 371/37.1 |
| 4,858,235 | 8/1989 | Matsuda et al. | 371/40.1 X |

Primary Examiner—Robert W. Beausoliel, Jr.
Assistant Examiner—Glenn Snyder
Attorney, Agent, or Firm—James R. Young

[57] ABSTRACT

Disclosed is a dynamic range control circuit for determining when to allow an error correction circuit to correct data read from a sector of a disk data storage device. The circuit has two sets of registers used to count bytes of information within a sector. A first set of registers counts bytes as the sector is being read from the disk, and accumulates a count of a pre-data field and a count of a data field. These counts are then loaded into a second set of registers, along with a count indicating the length of the redundancy field within the sector. As correction is being performed, the second set of registers is decremented and the values in the registers used to set an in-range signal which allows a correction to the data field and prevents correction to the pre-data or redundancy fields.

12 Claims, 7 Drawing Sheets ically on one
ERROR CORRECTION CODE DYNAMIC RANGE CONTROL SYSTEM This application is a continuation of application Ser. No. 07/504,620 filed Apr. 4, 1990, now abandoned.

BACKGROUND OF THE INVENTION

The present invention relates to data storage and data communications systems, and more particularly to rotating disk data storage devices. Even more particularly, the present invention relates to error correction systems used within the controllers of disk data storage devices and data communication systems.

Rotating disk data storage devices are typically organized in a series of concentric tracks, with the read/write head of such devices being movable between tracks. Within each track, data is stored in sectors, with each sector typically holding a consistent number of bytes of data. Since the advent of digital computing techniques, attention has focused on methods for reducing and correcting errors within the data of sectors. Such errors may be attributable to transient conditions in a computing apparatus or transmission channel, called "soft" errors; or they may be recurrent errors, such as those resulting from defects in data storage media, etc., called "hard" errors. Both of these types of errors can be corrected, depending on their location within a sector, and their length.

When data is being read from a disk drive, error correction circuits analyze the data to determine if an error has occurred, and to determine where the error has occurred within a sector. Since a sector contains three types of information, a pre-data field, data field, and redundancy field, the error correction circuits can detect incorrect errors in any of these three fields. A controller circuit can be made more efficient if only the data within a sector is stored, and the pre-data and redundancy information is discarded. However, if the pre-data and redundancy information has been discarded, the error correction circuits need some way of distinguishing between errors that have occurred within the data of the sector and errors that have occurred within either the pre-data or the redundancy fields. This is particularly important where the error correction is dynamic, where data in a sector is being corrected prior to the data being transferred back to a processor. Another problem that occurs with dynamic correction of data is caused by the speed at which data is transferred from the disk. Because of the speed of transfer, correction of one sector must be overlapped with receiving data for a subsequent sector from the disk. Therefore, the error correction code circuits must not only determine where an error has occurred in a sector and correct the error, the circuits must also perform this function while accumulating redundancy information for the next sector being transferred.

There is need in the art then for an error correction code circuit that separates errors that occur in the data field of a sector from errors that occur in either the pre-data field or the redundancy field of a sector. There is also a need in the art for such an error correction code circuit that performs this separation dynamically on one sector while a subsequent sector is being read from the disk and transferred to the controller. There is a further need for providing this error correction that allows sectors to be read which were written with different lengths of pre-data, different lengths of sector data, and different lengths of sector redundancy information.

SUMMARY OF THE INVENTION

It is an object of the present invention to provide an apparatus and method that allows data to be written to and read from a rotating data storage media having defects within a sector.

It is another object of the invention of provide dynamic, on the fly, error correction.

Another object of the invention is to provide such dynamic error correction while allowing a variable length sector preamble, variable length data, and variable length redundancy.

Another object is to provide automatic correction of the data portion of a sector without storing the sector preamble and redundancy fields in a data buffer.

A further object is to provide two sets of registers to allow error correction within a first sector while a second error containing sector is being read, to provide for dynamic correction of multiple consecutive error containing sectors.

The above and other objects are accomplished in a disk controller having a dynamic range control circuit. The circuit has two sets of registers used to count bytes of information within a sector. A first set of registers counts bytes as the sector is being read from the disk, and accumulates a count of a pre-data field and a count of a data field. Once theses two counts are accumulated, they are loaded into a second set of registers, along with a third counter indicating the length of the redundancy field within the sector. As correction is being performed, the second set of registers is decremented and the values in the registers used to set an in-range signal which identifies whether the correction information is available to correct data or available only to correct redundancy or pre-data information. If an error occurs while the in-range signal is active, the error has occurred in the data field of the sector, and a state machine within the invention will correct the data.

While the data is being corrected by the state machine, a signal from the state machine causes the second set of counters to count up and the in-range circuit will stay active only so long as correction information applies to the sector data field. The down counting and up counting sequence allows the in-range signal to indicate whether correction information is for the data field within a sector or for the pre-data field or for the redundancy field. Since only the data field is stored in the buffer, only the data field can or need be corrected. The in-range signal allows the circuit to correctly handle errors that span the boundaries between the pre-data field and the data field, correcting only the data field, and to correctly handle errors that span between the data field and the redundancy field, again correcting only the data field.

Having two sets of counters allows the circuit to read a second sector while a first sector is being corrected. Furthermore, both sectors may contain correctable errors, and the circuit will correct the data field portion of both sectors. This process may be extended to any number of consecutive error containing sectors, and each will be corrected so long as the redundancy information is sufficient to correct the sectors.

Because the first set of registers counts information as it is being received from the disk, the pre-data field of the sector, and the data field of the sector can be variable in length. That is, each sector can have a different length pre-data field, and a different length data field up to the limit that can be corrected by the error correction code circuit. The circuit also has the ability to allow either of two lengths of error correction code redundancy information in a particular sector.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
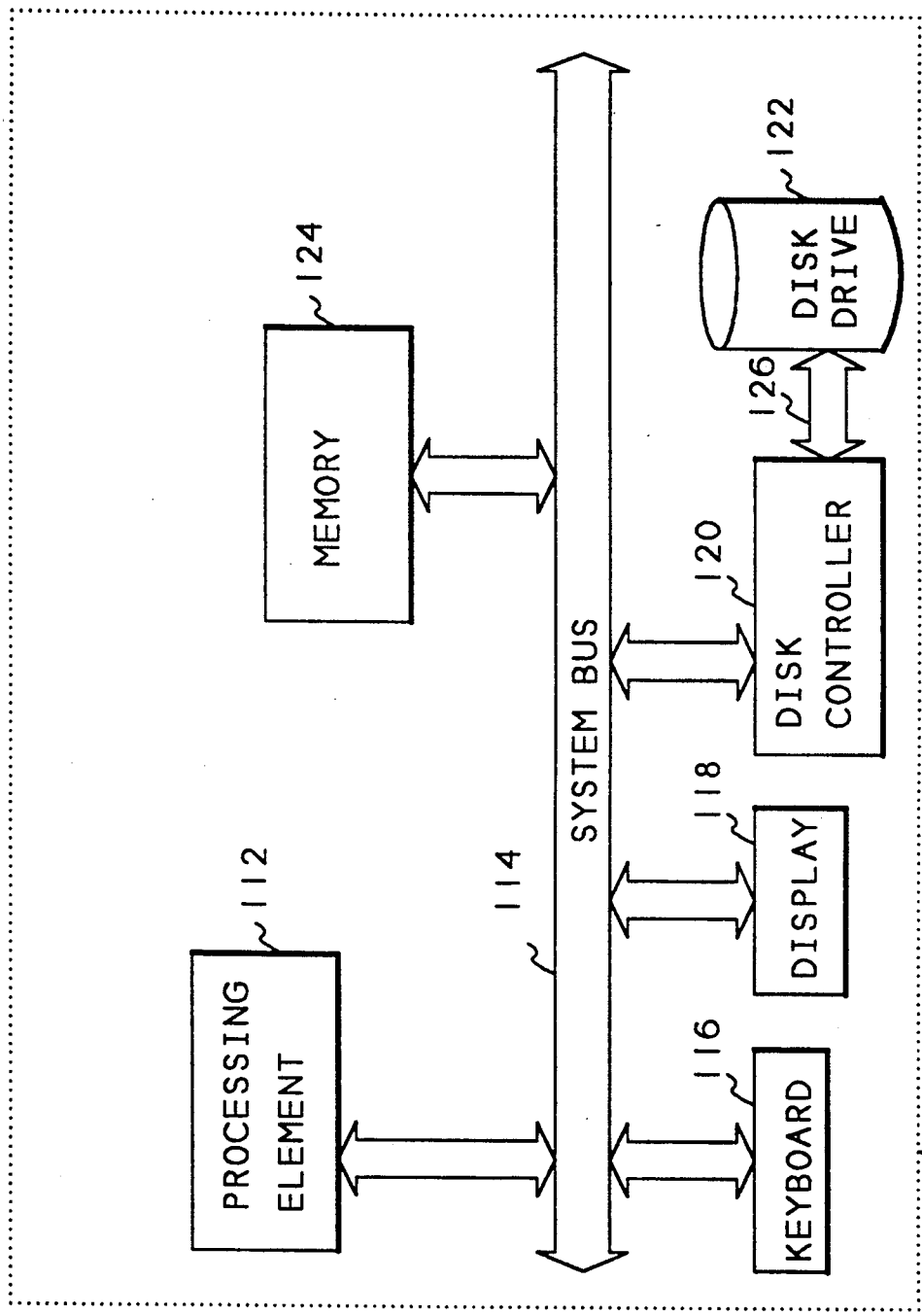
FIG. 1 is a block diagram of a computer system employing the present invention.

FIG. 1 shows a block diagram of a computer system that incorporates the Dynamic Range Control System of the present invention. Referring now to FIG. 1, a computer system 110 is shown having a processing element 112. The processing element 112 communicates with other elements of the system through a system bus 114. A user inputs information to the computer system 110 through a keyboard 116 attached to the system bus 114, and the computer system 110 outputs information to a user through a display 118 attached to the system bus 114. The processing element receives instructions from a memory 124, which also contains any temporary storage used by the processing element 112. Longer term storage is provided by disk 122 which is controlled by a disk controller 120 attached to the system bus 114. The Dynamic Range Control System apparatus and method of the present invention is contained within the disk controller 120.

Figure 2:
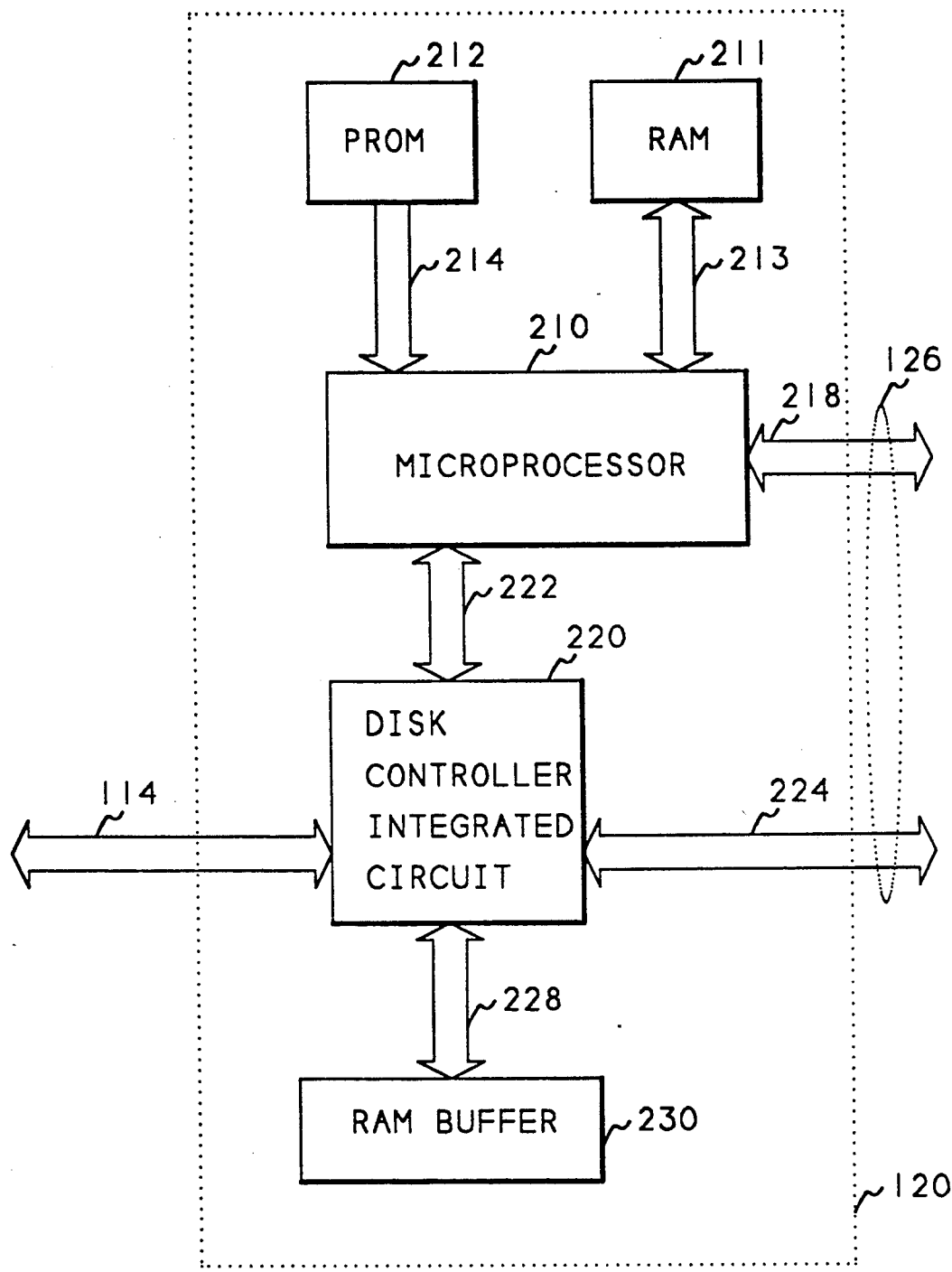
FIG. 2 is a block diagram of the disk control unit of FIG. 1.

FIG. 2 shows a block diagram of the disk controller 120 (FIG. 1). Referring now to FIG. 2, the disk controller 120 contains a microprocessor 210, a RAM memory 211 and a PROM memory 212. The microprocessor receives instructions from the PROM memory 212 via a bus 214. These instructions allow the microprocessor to guide overall controller and disk drive operations. RAM 211, via bus 213, provides temporary data storage for the microprocessor. The microprocessor 210 communicates with the host computer through bus 222 and the disk controller integrated circuit 220, which allows the microprocessor 210 to access the system bus 114. This provides a means for the microprocessor 210 to interpret commands from, and return status to, the processing element 112. The microprocessor 210 may also communicate with a RAM data buffer 230 via the disk controller integrated circuit 220 and bus 228 to allow the microprocessor 210 to correct errors in data transferred from the disk 122 (FIG. 1). The microprocessor handles the control and low speed operations between the disk 122 (FIG. 1) and the system bus 114 (FIG. 1).

A disk controller integrated circuit 220 contains the logic necessary to perform the high speed data transfers to and from the disk, including the dynamic range control system of the present invention. It communicates with the microprocessor 210 over a bus 222, and to the disk over the disk data bus 224. The disk controller IC 220 transfers data to and from a RAM data buffer 230 via a bus 228. The Ram data buffer 230 stores data in transit between the disk 122 and the system bus 114, and provides for speed matching between the memory 124 (FIG. 1) and the disk 122.

Figure 3:
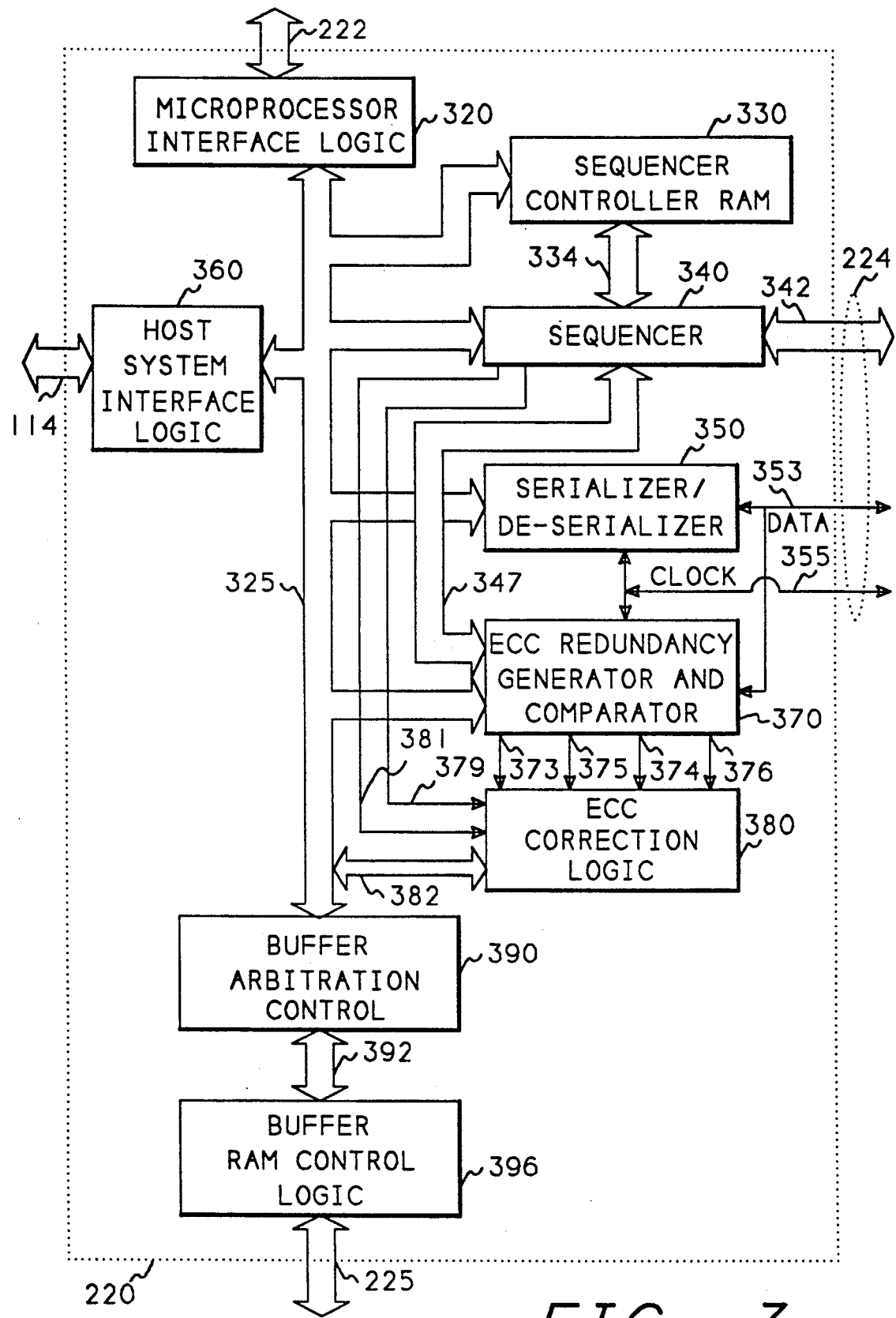
FIG. 3 is a block diagram of the disk controller integrated circuit of FIG. 2.

FIG. 3 shows a block diagram of the disk controller integrated circuit 220 (FIG. 2). Referring now to FIG. 3, the microprocessor 210 (FIG. 2) communicates with, initializes and maintains control over, the disk controller integrated circuit 220. The microprocessor communicates via bus 222 and interface logic 320 to gain access to the primary internal bus 325. In a similar manner, the host interface 114 accesses the primary internal bus 325 via host interface logic 360. This configuration provides host interface 114 with a communication path to the microprocessor 210 (FIG. 2) and data access to RAM buffer 230 (FIG. 2). The RAM buffer 230 (FIG. 2) can be linked to three data paths, host system interface 114, microprocessor interface 222 or serializer/de-serializer 350. Priority resolving and arbitration is performed by buffer arbitration control 390. Buffer RAM control logic 396 assures that proper address and control signals are sent to the external RAM buffer 230 (FIG. 2) for each buffer data transaction.

As a disk data transfer is initiated, sequencer 340 performs high speed synchronized control of disk data functions. Sequencer 340 obtains its programming instructions from sequencer control RAM 330 through bus 334. Prior to starting a disk operation, microprocessor 210 (FIG. 2) loads sequencer control RAM 330 via bus 222, microprocessor interface logic 320, and primary bus 325. The sequencer 340 relieves the microprocessor from the real-time task of following high speed disk activity while still allowing the microprocessor to pre-define how the disk operation will be performed. Sequencer 340 directly controls disk operations via bus 342 and simultaneously coordinates internal circuit activities via bus 347 and bus 325.

When the processing element 112 sends a disk write command, the microprocessor 210 interprets the command and starts the write operation. First, the microprocessor 210 loads a sequencer program into the sequencer control RAM 330 which will cause sequencer 340 to write data from the RAM buffer 230 to the disk 112. Before starting the sequencer, however, the microprocessor 210 instructs the host system interface logic 360 and the buffer arbitration control 390 to transfer the host data from the memory 124 (FIG. 1) over system bus 114, and store the host data into RAM buffer 230. After transferring the data to the RAM buffer 230, the microprocessor 210 starts the sequencer 340. Sequencer 340 first instructs the disk 122, via bus 342, to locate the correct sector for the write operation. After the disk 122 finds the correct sector, the sequencer 340 starts the data transfer by instructing buffer arbitration control 390 to read the previously stored data from RAM buffer 230 and transfer this data to serializer/de-serializer 350. Serializer/de-serializer 350 takes the 8 bit parallel data from bus 325, loads it into a shift register (not shown), and converts it to serial NRZ (non-return to zero) data by shifting the shift register using data clock 355, which is synchronized to the rotating media by the disk 122. The serial data is sent over data line 353 to the disk 122 and to the ECC redundancy generator and comparator 370. The disk records the serial data in the sector designated in the write command, and, simultaneously, the ECC redundancy generator and comparator 370 creates redundancy data as defined by the ECC polynomial being used. Since the ECC redundancy generator 370 was initialized to a known state before data transfer was started, the residual data in the ECC redundancy generator 370, upon completion of the data transfer, will be predictable and unique for a given data input. After transferring all of the data in the RAM buffer 230, sequencer 340 immediately multiplexes the data source for bus 353 from serializer/de-serializer 350 to ECC redundancy generator 370 and starts transferring the redundancy data to the disk for writing into the sector. Data clock 355 continues to clock the ECC redundancy generator 370 to append the redundancy data to the host data already written in the sector.

When a disk read operation is requested by the processing element 112, a sequence of events similar to the above described sequence is initiated, with the order of events and data path essentially reversed. As serial data is read from the requested sector on the disk, clocked into ECC redundancy generator and comparator 370, and clocked into serializer/de-serializer 350, the serial data is shifted into the pre-initialized ECC redundancy generator 370 using the same ECC polynomial used when the data was originally written to the disk. The serial data is concurrently shifted into the serializer/de-serializer and, after each 8 bit byte is assembled, the byte is stored in the RAM buffer 230 via buffer arbitration control 390. After transferring all the sector data, the remaining information in the ECC shift register is compared to the ECC redundancy field that was appended to the data when the sector was written. Should a loss of integrity occur in either the data or ECC redundancy, the recorded and newly generated remainders will not agree. In this event, the ECC redundancy generator and comparator 370 immediately signals the sequencer 340 via bus 347 to allow the sequencer to take corrective action. When error correction is needed, the reverse of the original ECC polynomial is loaded into the ECC redundancy generator 370 by microprocessor command via bus 382, ECC correction logic 380 and bus 374. The remainder (from the read operation) is then inverted and reverse shifted through the ECC redundancy generator 370 until an error condition is found. Assuming the severity of the error is within the correctable limits of the ECC polynomial, the ECC Correction Logic reads the new contents of the ECC redundancy generator 370 and uses this syndrome to correct the defective data stored in the RAM buffer.

Figure 4:
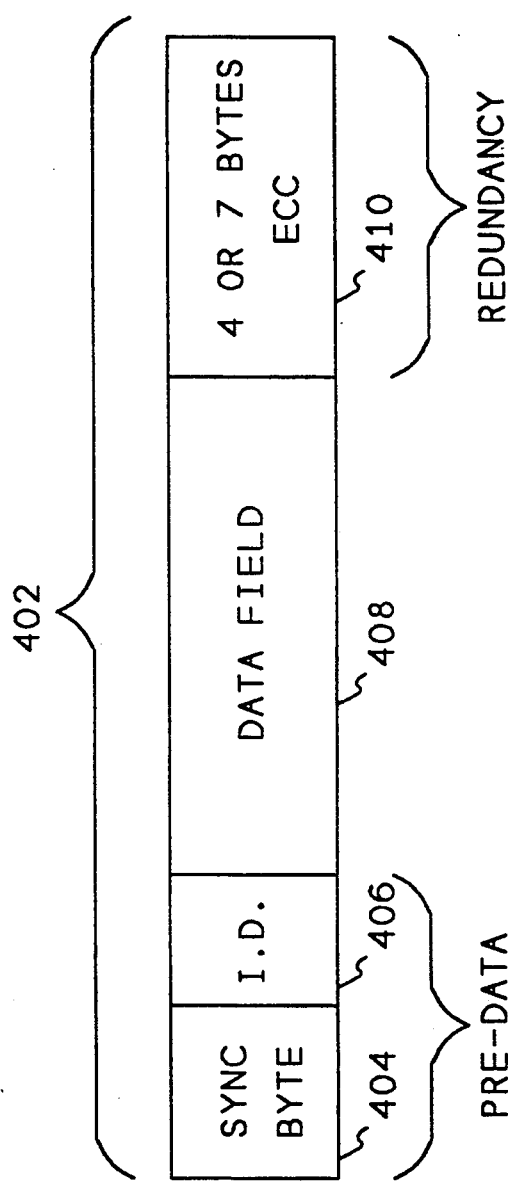
FIG. 4 is a diagram of the fields within a sector of information stored on a disk connected to the present invention.

FIG. 4 shows a diagram of the information contained with a sector of a disk connected to the present invention. Referring now to FIG. 4, a disk sector 402 is comprised of a sync byte 404 which is used to allow the controller to synchronize itself for receiving the following information in the sector. An ID field 406 can be used to hold various information regarding the sector, and is optional to the present invention. A data field 408 contains the data for the sector and is limited in length only by the ability of the error correction code redundancy polynomial to correct the data. Typically the data field 408 contains 512 bytes, however, some disks also use 1024 bytes in the data field. The redundancy field 410 is used to contain the error correction code redundancy information. This information is four bytes for a thirty-two bit error correction code polynomial, and seven bytes for a fifty-six bit error correction code polynomial. In the present invention, the sync byte 404 and the ID information 406 can be a total of seven bytes in length. The data field can be any length up to 1,024, and the redundancy field 410 can be four or seven bytes long.

Figure 5:
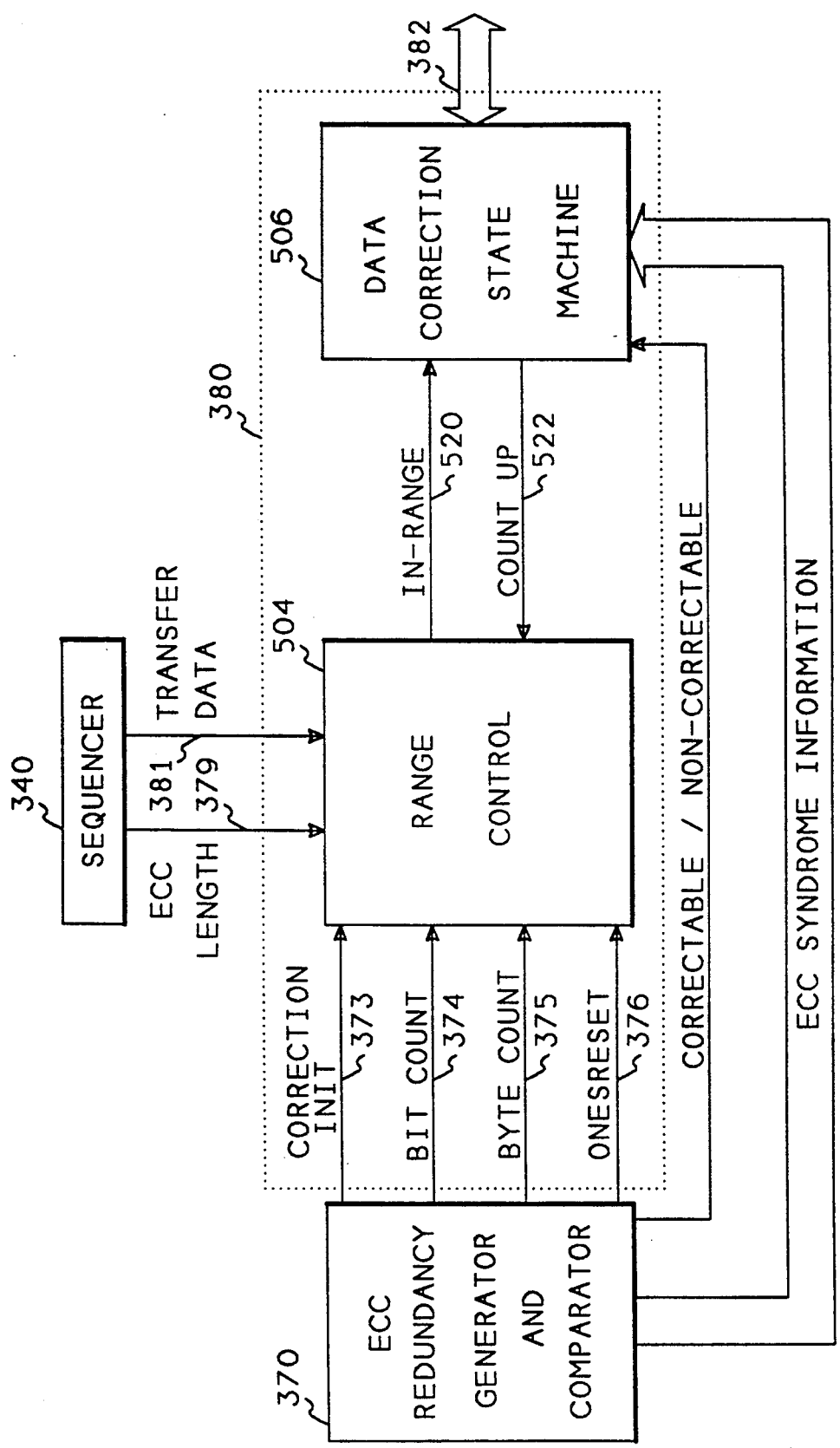
FIG. 5 is a block diagram showing the environment of the invention.

FIG. 5 is a block diagram showing the environment of the present invention. Referring now to FIG. 5, ECC redundancy generator and comparator 370 and sequencer 340 send information to the error code correction logic 380. These blocks were previously shown in FIG. 3. Within the ECC correction logic 380, a range control circuit 504 receives several signals from the ECC redundancy generator and comparator 370 and receives a transfer data signal 381 and an ECC length signal 379 from the sequencer 340. The range control circuit 504 determines when the ECC redundancy generator and comparator has provided ECC syndrome information which is within the data field and is therefore usable by the data correction state machine 506 to correct data. The correction init signal 373 tells the range control 504 that the ECC redundancy generator and comparator circuit 370 is about to start the correction sequence where it will determine where an error has occurred. The bit count signal 374 is used by the ECC redundancy generator and comparator 370 to indicate to the range control 504 that a new bit or bits of information within the sector is being received. Because of the operation of the ECC redundancy generator and comparator 370 in the circuit of the present invention, the bit count signal 374 indicates that a pair of bits has been received. The present invention, however, could allow the bit count signal 374 to indicate a single bit, a pair of bits, etc., have been received. The byte count signal 375 is used by the ECC redundancy generator and comparator circuit 370 to indicate to the range control 504 each byte as it decrements down through the sector during the error correction process. The ones reset signal 376 is used by the ECC redundancy generator and comparator circuit 370 to indicate that counters within the range control 504 should reset for receiving data for another sector. The transfer data signal 381 indicates to the range control circuit 504 that the data field within a sector is being transferred from a disk. The in-range signal 520 is used by the range control circuit 504 to indicate to the data correction state machine 506 that correction information relates to the data field of the sector. The count up signal 522 is used by the data corrections state machine 506 to indicate to the range control 504 that it has incremented its data counter in the process of a correction.

Figure 6:
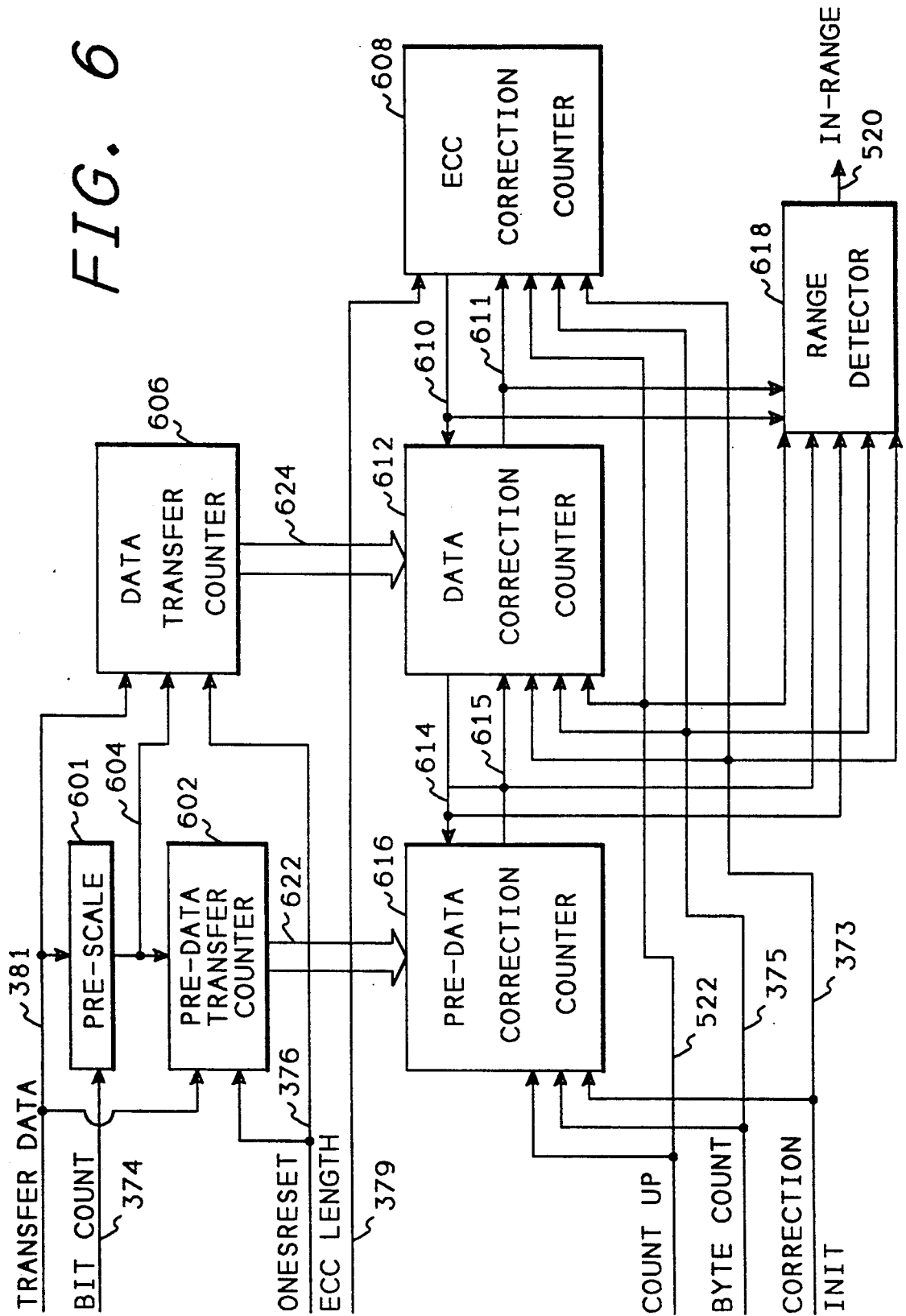
FIG. 6 is a block diagram of the range control circuit of the present invention.

FIG. 6 is a block diagram of the range control circuit 504 (FIG. 5) of the present invention. Referring now to FIG. 6, pre-data transfer counter 602 and data transfer counter 606 are used to count up as information is being received from a disk. Pre-data correction counter 616, data correction counter 612, and ECC correction counter 608 are used to count down and up during the correction process. Range detector circuit 618 is used to determine when the error correction is within the data field of a sector.

Just prior to sector data being transferred from a disk, ones reset signal 376 resets the pre-data transfer counter 602 and the data transfer counter 606. As bits are received from the disk, bit count signal 374 is divided by a pre-scale circuit 601 to provide a signal 604 which is used to increment the pre-data transfer counter 602 or the data transfer counter 606 each time a byte is received. In the present invention, bit count signal 374 occurs every two bits, therefore, pre-scale circuit 601 is a divide by four circuit. Transfer data signal 381 is enabled whenever the data field portion of a sector is being transferred. Therefore, transfer data signal 381 is used to disable counting of the pre-data transfer counter 602 and enable counting of data transfer counter 606. After the ones reset signal 376 is received, the transfer data signal 381 will not be active during the transfer of the pre-data portion of the sector. With transfer data signal 381 not active, pre-data transfer counter 602 will count up each time a byte is received as determined by signal 604. Once the pre-data field has been received from the disk, the transfer data signal 381 will become active, which disables pre-data transfer counter 602 and enables data transfer counter 606. Thereafter, signal 604 will cause the data transfer counter to increment so long as the data field is being transferred. After the entire data field has been transferred, data transfer signal 381 will become inactive and neither counter will increment while the redundancy field is received. The net effect of the above described process is that after a sector has been read from a disk, pre-data transfer counter 602 will contain the number of bytes in the pre-data field of the sector, and data transfer counter 606 will contain the number of bytes in the data field of the sector.

At the start of the correction process, correction init signal 373 will activate causing pre-data correction counter 616 to load the value from pre-data transfer counter 602. Activation of correction init 373 will also cause data correction counter 612 to parallel load all of the bits from data transfer counter 606, and it will cause ECC correction counter to pre-load a value of four or seven, depending on the level of ECC length signal 379. ECC length signal 379 is set by the sequencer 340 to indicate whether a thirty-two bit or a fifty-six bit error correction code polynomial is being used. After correction init signal 373 has activated, pre-data correction counter 616, data correction counter 612, and ECC correction counter 608 contain the number of bytes in the pre-data portion of the sector, the data field portion of the sector, and the redundancy field portion of the sector, respectively. Therefore, these three counters are set to decrement during the correction process.

As the ECC redundancy generator and comparator 370 is creating the ECC syndrome information used for error correction, it will decrement byte count signal 375. Byte count signal 375 will cause the pre-data correction counter 616, data correction counter 612, and ECC correction counter 608 to decrement in step with the ECC redundancy generator and comparator 370. Each time the byte count signal 375 is activated, the ECC correction counter 608 will decrement one count. When ECC correction counter 608 reaches zero and causes underflow signal 610 to activate, the counter ceases decrementing. With underflow signal 610 activated, data correction counter 612 will decrement each time byte count signal 375 is received. Once data correction counter 612 reaches zero, it will activate underflow signal 614 and cease decrementing. Once underflow signal 614 is activated, pre-data correction counter 616 will decrement each time byte count signal 375 is received.

When the ECC redundancy generator and comparator 370 detects the location of a correctable error, it will cease activating byte count signal 375, and send a correctable signal to the data correction state machine 506 (FIG. 5). At the same time it sends the correctable indicator to the data correction state machine 506, it will send all the ECC syndrome information to the data correction state machine 506. The data correction state machine then proceeds to use the ECC syndrome information to correct data in the data buffer controlled by the buffer arbitration control 390 (FIG. 3) and the buffer RAM control logic 396 (FIG. 3). The data correction state machine 506 will take the ECC syndrome information and correct data in the buffer, by using each byte of the ECC syndrome information one at a time. As each byte of the ECC syndrome information is used, data correction state machine 506 will activate the count up signal 522. Each time count up signal 522 is received by the circuit of FIG. 6, pre-data correction counter 616 will increment one count, if it has not yet reached a value equal to the number of bytes in the pre-data field of the sector. Once pre-data correction counter 616 reaches the number of bytes contained in the pre-data field of the sector, it will activate overflow signal 615. Once overflow signal 615 is active, data correction counter 612 will increment each time a count up signal 522 is received. Data correction counter 612 will continue to count up until it reaches a value equal to the number of bytes in the data field of the sector. Once data correction counter 612 is equal to the number of bytes contained in the data field, it will activate overflow signal 611. Once overflow signal 611 is activated, ECC correction counter 608 will increment each time a count up signal is received.

As the circuit of FIG. 6 operates in the above described manner, in-range signal 520 will be initially reset by correction init signal 373, and therefore be inactive. In-range signal 520 will activate when underflow signal 610 is received indicating that the ECC correction counter has decremented to zero and that the count is now within the data field of the sector. In-range signal 520 will continue to be active until underflow signal 614 is activated indicating that the count has decremented beyond the data field of the sector and is now into the pre-data field of the sector. Therefore, in-range signal 520 will be active whenever ECC correction counter 608 is equal to zero, and data correction counter 612 is not equal to zero. In-range signal 520 will be inactive whenever ECC correction counter 608 is not equal to zero, or when data correction counter 612 is equal to zero.

Figure 7:
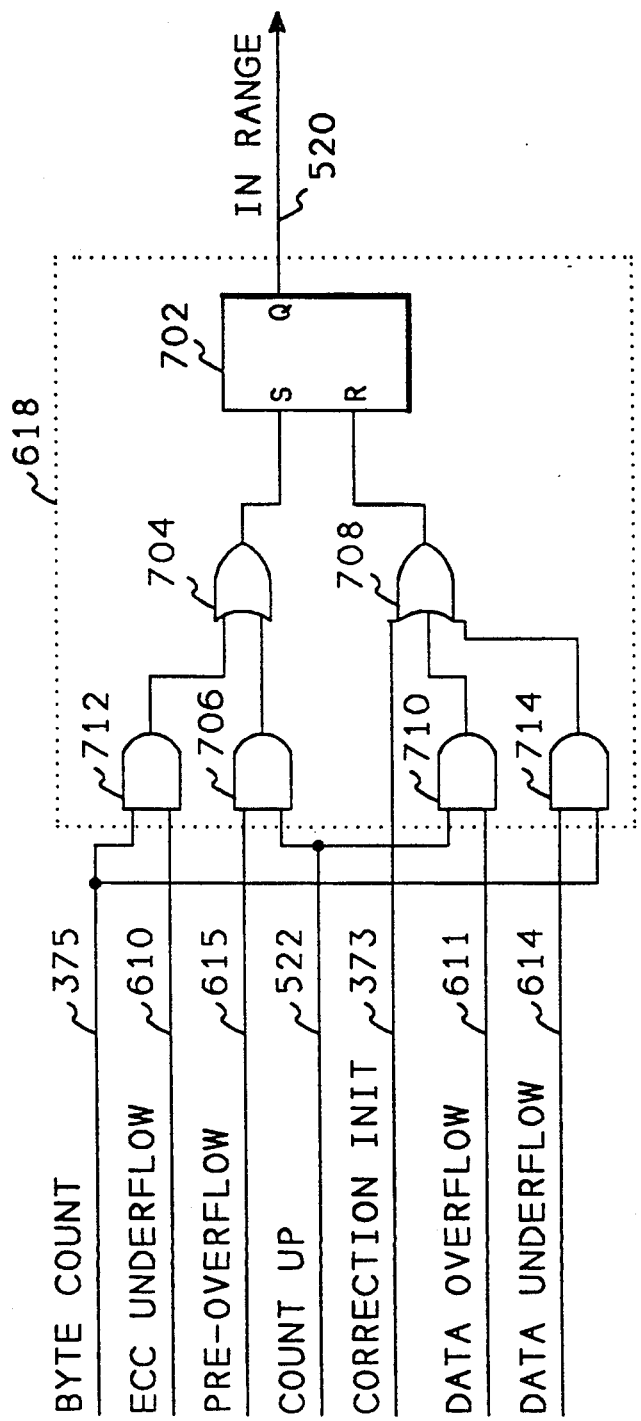
FIG. 7 is a schematic diagram of the range detector circuit of FIG. 6.

FIG. 7 shows a schematic diagram of the range detector circuit 618 of FIG. 6. Referring now to FIG. 7, set/reset flip flop 702 is used to create the in-range signal 520. When correction init signal 373 is activated, it passes through OR circuit 708, to reset the in-range flip flop 702. When ECC correction counter 608 (FIG. 6) decrements to zero and sets the ECC underflow signal 610, the next byte count signal 375 together with ECC underflow 610 will pass through AND gate 712 and OR gate 704 to set in-range flip flop 702. When data correction counter 612 (FIG. 6) decrements to zero, it activates data underflow signal 614. This signal, when combined with byte count signal 375 will pass through AND gate 714 and OR gate 708 to reset in-range flip flop 702. When an error is located by the ECC redundancy generator and comparator 370, and the data correction state machine 506 starts to correct the error, it may cause in-range flip flop 702 to change state depending on the values contained in pre-data correction counter 616, and data correction counter 612. If, while the data correction state machine 506 is correcting an error, pre-data correction counter 616 reaches the number of bytes in the pre-data field and causes overflow signal 615 to activate, AND gate 706 will combine this signal with the next count up signal 522 and set in-range flip flop 702 through OR gate 704. If, while data correction state machine 506 is correcting an error, data correction counter 612 reaches the number of bytes contained in the data field of the sector, it will activate data overflow signal 611, and this signal will be combined with count up signal 522 by AND gate 710 to reset in-range flip flop 702 through OR gate 708. These last conditions will occur when a multiple bit error is being corrected, and the error spans the boundary between the pre-data field of the sector and the data field of the sector, or the error spans the boundary between the data field of the sector, and the redundancy field of the sector. For example, if an error occurs having multiple bits in error, and the error bits span between the pre-data field of the sector, and the data field of the sector, in-range signal 520 will be inactive while the error bits of the pre-data field of the sector are correctable by the ECC syndrome information. Because the pre-data field is not stored in the data buffer, there is no need for correction, therefore the in-range signal 520 will be inactive. Once the data correction state machine increments to the point where the ECC syndrome information is capable of correcting bytes in the data field, pre-data correction counter 616 will overflow causing in-range flip flop 702 to activate. Thereafter, bytes in the data field will be corrected by the data correction state machine 506. A similar situation occurs when the error spans the boundary between the data field and the redundancy field of a sector.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In an electronic data storage device controller for reading a plurality of sectors from a data storage device, each of said sectors having a pre-data field, a data field, and a redundancy field, and wherein said device controller provides correction information for said pre-data field, said data field, and said redundancy field, dynamic range control apparatus for indicating which of said correction information is only for said data field, said apparatus comprising:

means for determining a count of a number of bytes in each of said fields, said means providing a pre-data count, a data count, and a redundancy count;

counter means, responsive to a byte count signal, for decrementing each of said counts;

range indicator means responsive to said counter means for indicating which of said correction information is only for said data field, wherein correction of said pre-data field and said redundancy field is prevented.

2. The apparatus of claim 1 wherein said counter means comprises:

first counter means for decrementing said redundancy count each time a byte count signal is received;

redundancy underflow means for indicating a redundancy underflow when said first counter means decrements to zero;

second counter means for decrementing said data count each time a byte count signal is received after said redundancy underflow is indicated;

data underflow means for indicating a data underflow when said second counter means decrements to zero;

third counter means for decrementing said pre-data count each time a byte count signal is received after said data underflow is indicated.

3. The apparatus of claim 2 wherein said range indicator means comprises means responsive to said redundancy underflow and said data underflow for indicating which of said correction information is only for said data field.

4. The apparatus of claim 1 wherein said determining means and said counting means operate simultaneously, whereby one sector may be read while a previously read sector is being corrected.

5. The apparatus of claim 1 wherein said counter means further comprises means responsive to an up-count signal for incrementing said counters.

6. The apparatus of claim 5 wherein said range indicator means further comprises means for indicating said data field may be corrected when said redundancy count is zero, and said data count is non-zero.

7. In an electronic data storage device controller for reading a plurality of sectors from a data storage device, each of said sectors having a pre-data field, a data field, and a redundancy field, and wherein said device controller provides correction information for said pre-data field, said data field, and said redundancy field, dynamic range control apparatus for indicating which of said correction information is only for said data field, said apparatus comprising:

pre-data count means for determining a count of a number of bytes in said pre-data field;

data count means for determining a count of a number of bytes in said data field;

redundancy count means for determining a count of a number of bytes in said redundancy field;

first counter means for decrementing said redundancy count means each time a byte count signal is received;

redundancy underflow means for indicating a redundancy underflow when said first counter means decrements to zero;

second counter means for decrementing said data count means each time a byte count signal is received after said redundancy underflow is indicated;

data underflow means for indicating a data underflow when said second counter means decrements to zero;

third counter means for decrementing said pre-data count means each time a byte count signal is received after said data underflow is indicated; and range control means responsive to said redundancy underflow and said data underflow for indicating which of said correction information is only for said data field, wherein correction of said pre-data field and said redundancy field is prevented.

8. The apparatus of claim 7 wherein said means for determining said counts operate simultaneously with said counter means and said underflow indicating means whereby one sector may be read while a previously read sector is being corrected.

9. The apparatus of claim 7 wherein said first counter means, said second counter means, and said third counter means further comprises means responsive to an up-count signal for incrementing said counters.

10. The apparatus of claim 9 wherein said range control means further comprises means for indicating correction information is only for said data field when said redundancy count is zero, and said data count is non-zero.

11. In an electronic data storage device controller having means for reading a plurality of sectors from a data storage device, each of said sectors having a pre-data field, a data field, and a redundancy field, and wherein said device controller provides correction information for said pre-data field, said data field, and said redundancy field, a process for providing an indication that said correction information is only for said data field, said process comprising:
  (a) determining a count of a number of bytes in said pre-data field and transferring said count to a pre-data counter;
  (b) determining a count of a number of bytes in said data field and transferring said count to a data counter;
  (c) determining a count of a number of bytes in said redundancy field and transferring said count to a redundancy counter;
  (d) decrementing said redundancy counter each time a byte count signal is received;
  (e) decrementing said data counter each time a byte count signal is received and said redundancy counter is zero;
  (f) decrementing said pre-data counter each time a byte count signal is received and said data counter is zero; and
  (g) indicating that said correction information is only for said data field when said redundancy counter is zero and said data counter is non-zero, wherein correction of said pre-data field and said redundancy field is prevented.

12. The process of claim 11 wherein steps (d), (e), and (f) further comprise the steps of:
  (d1) incrementing said redundancy counter each time an up-count signal is received and said data counter equals said count value determined in step (b);
  (e1) incrementing said data counter each time an up-count signal is received and said data counter does not equal said count value determined in step (b), and said pre-data counter equals said count value determined in step (a); and
  (f1) incrementing said pre-data counter each time an up-count signal is received when said pre-data counter is not equal to said count value determined in step (a).

* * * * *